United States Patent
Berti et al.

(10) Patent No.: US 11,449,811 B2
(45) Date of Patent: Sep. 20, 2022

(54) DIGITAL TWIN ARTICLE RECOMMENDATION CONSULTATION

(71) Applicant: INTERNATIONAL BUSINESS MACHINES CORPORATION, Armonk, NY (US)

(72) Inventors: Joseph G. Berti, Highlands Ranch, CO (US); Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 16/693,621

(22) Filed: Nov. 25, 2019

(65) Prior Publication Data
US 2021/0158242 A1 May 27, 2021

(51) Int. Cl.
| | | |
|---|---|---|
| *G06Q 10/00* | (2012.01) | |
| *G06N 20/00* | (2019.01) | |
| *G06F 16/00* | (2019.01) | |
| *G06Q 10/06* | (2012.01) | |
| *G06F 16/2455* | (2019.01) | |

(52) U.S. Cl.
CPC . *G06Q 10/06311* (2013.01); *G06F 16/24558* (2019.01); *G06N 20/00* (2019.01)

(58) Field of Classification Search
CPC .......................................... G06Q 10/00–50/00
See application file for complete search history.

(56) References Cited

U.S. PATENT DOCUMENTS

| | | | |
|---|---|---|---|
| 5,867,823 A | * | 2/1999 | Richardson ........... G06F 15/025 705/7.13 |
| 6,691,064 B2 | | 2/2004 | Vroman |
| 9,246,756 B2 | | 1/2016 | Jessee et al. |

(Continued)

FOREIGN PATENT DOCUMENTS

| | | |
|---|---|---|
| CN | 101256404 A | 9/2008 |
| CN | 108881474 A | 11/2018 |

(Continued)

OTHER PUBLICATIONS

BM: List of IBM Patents or Patent Applications Treated as Related (Appendix P), Nov. 27, 2019, pp. 1-2.

(Continued)

*Primary Examiner* — Mustafa Iqbal
(74) *Attorney, Agent, or Firm* — Robert D. Bean (57) ABSTRACT

A method, computer system, and a computer program product for consulting a technician on one or more appropriate articles based on a digital twin associated with a physical asset is provided. The present invention may include assigning a technician to a job associated with the physical asset. The present invention may then include associating the digital twin with the physical asset. The present invention may also include matching one or more digital twin resources from a digital twin repository. The present invention may then include identifying a piece of relevant data from the matched one or more digital twin resources to the job associated with the physical asset. The present invention may further include identifying the one or more appropriate articles for the assigned technician to utilize to perform the job associated with the physical asset from the identified piece of relevant data.

20 Claims, 5 Drawing Sheets

(56) References Cited

U.S. PATENT DOCUMENTS

| | | | |
|---|---|---|---|
| 9,639,820 | B2 | 5/2017 | Singh |
| 9,984,344 | B2 | 5/2018 | Singh |
| 10,001,759 | B2 | 6/2018 | Gupta |
| 10,074,402 | B2 | 9/2018 | Mahate et al. |
| 10,305,734 | B2 | 5/2019 | Dost et al. |
| 10,404,569 | B2 | 9/2019 | Hershey |
| 10,522,854 | B2 * | 12/2019 | Wang .................. H01M 8/0491 |
| 10,785,307 | B2 | 9/2020 | DeLuca |
| 10,887,082 | B2 | 1/2021 | Chamarajnager |
| 10,958,552 | B2 | 3/2021 | Ly |
| 10,984,122 | B2 | 4/2021 | Thomas |
| 11,012,228 | B2 | 5/2021 | Mercuri |
| 2004/0176929 | A1 | 9/2004 | Joubert et al. |
| 2013/0006717 | A1 * | 1/2013 | Oleson .................. G09B 19/00 705/7.41 |
| 2014/0100158 | A1 | 4/2014 | Castel et al. |
| 2016/0247129 | A1 * | 8/2016 | Song ...................... G06Q 10/20 |
| 2017/0140580 | A1 * | 5/2017 | Marr ...................... G06Q 10/20 |
| 2017/0171705 | A1 | 6/2017 | Bordash et al. |
| 2018/0094953 | A1 | 4/2018 | Colson et al. |
| 2018/0096175 | A1 | 4/2018 | Schmeling et al. |
| 2018/0139056 | A1 | 5/2018 | Imai et al. |
| 2018/0210436 | A1 * | 7/2018 | Burd .................. G05B 23/0294 |
| 2019/0019090 | A1 | 1/2019 | Chacko et al. |
| 2019/0087544 | A1 | 3/2019 | Peterson |
| 2019/0098015 | A1 | 3/2019 | Hookham-Miller |
| 2019/0098113 | A1 | 3/2019 | Park et al. |
| 2019/0121334 | A1 | 4/2019 | Song et al. |
| 2019/0138662 | A1 | 5/2019 | Deutsch et al. |
| 2019/0138667 | A1 * | 5/2019 | Benesh .................. G06Q 10/063 |
| 2019/0138970 | A1 * | 5/2019 | Deutsch .................. G06F 9/542 |
| 2019/0147412 | A1 | 5/2019 | Chiaramonte et al. |
| 2019/0158270 | A1 | 5/2019 | Berti |
| 2019/0339688 | A1 | 11/2019 | Cella |
| 2019/0349426 | A1 | 11/2019 | Smith |
| 2020/0311164 | A1 * | 10/2020 | Golan .................. G06F 16/783 |
| 2021/0067591 | A1 | 3/2021 | Ly |
| 2021/0158174 | A1 | 5/2021 | DeLuca |
| 2021/0158307 | A1 | 5/2021 | DeLuca |
| 2021/0160961 | A1 | 5/2021 | DeLuca |
| 2021/0192413 | A1 * | 6/2021 | Shirazipour ........... G06N 20/00 |
| 2021/0357422 | A1 | 11/2021 | Cella |

FOREIGN PATENT DOCUMENTS

| | | | |
|---|---|---|---|
| EP | 0908805 | A1 | 4/1999 |
| WO | 2018183275 | A1 | 10/2018 |
| WO | 2018234741 | A1 | 12/2018 |
| WO | 2019010068 | A1 | 1/2019 |
| WO | WO-2019180435 | A1 * | 9/2019 ......... G06F 16/2423 |

OTHER PUBLICATIONS

Pending U.S. Appl. No. 16/693,575, filed Nov. 25, 2019, entitled: "Equipment Maintenance Assistant Training Based on Digital Twin Resources", 41 pages.

Pending U.S. Appl. No. 16/693,545, filed Nov. 25, 2019, entitled: "Blockchain Ledger Entry Upon Maintenance of Asset and Anomaly Detection Correction", 42 pages.

Pending U.S. Appl. No. 16/693,597, filed Nov. 25, 2019, entitled: "Internet of Things Sensor Major and Minor Event Blockchain Decisioning", 42 pages.

Mell et al., "The NIST Definition of Cloud Computing", Recommendations of the National Institute of Standards and Technology, NIST Special Publication 800-145, Sep. 2011, 7 pages.

Tao et al., "Digital twin-driven product design, manufacturing and service with big data", Int. J. Adv. Manuf. Technol., Mar. 16, 2017, 15 pages.

Nuss et al., "Towards Blockchain-Based Identity and Access Management for Internet of Things in Enterprises", International Conference on Trust and Privacy in Digital Business, Jul. 27, 2018, pp. 167-181.

Albano et al., "Blockchain Technology Helps Maintenance to Stop Climate Change", Conference Paper, Cister Research Centre in Real-Time & Embedded Computing Systems, CISTER-TR-180702, Jun. 21, 2018, 10 pages.

Gutierrez, "Boeing Improves Operations with Blockchain and the Internet of Things", Altoros Blog, May 24, 2017, 12 pages, https://www.altoros.com/blog/author/carlo/.

Hegadekatti, "Automation Processes and Blockchain Systems", MPRA, Munich Personal RePEc Archive, Feb. 6, 2017, pp. 1-8.

Youtube, "IoT, Blockchain, and Avionics a Demonstration", IBM Watson Internet of Things, Jan. 10, 2017, 2 pages.

Madhwal et al., "Blockchain and Supply Chain Management: Aircrafts' Parts' Business Case", 28th DAAAM International Symposium on Intelligent Manufacturing and Automation, (2017), pp. 1051-1056.

De'Shazer, "Proof: Blockchain-based Asset Management For Business", YouTube, Nov. 14, 2016, 2 pages.

Rajkov, "Blockchain for Aircraft Spare Part Management: Evaluating the Robustness of the Maintenance, Repair and Overhaul Business Model", Accenture Strategy, TUDelft, Master thesis submitted to Delft University of Technology in partial fulfillment of the requirements for the degree of Master of Science in Management of Technology, Sep. 20, 2018, 99 pages.

Riddle & Code, "How to Use the Digital Twin Technology Work Package", printed Jun. 27, 2019, 6 pages, https://www.riddleandcode.com/poc/.

Viswanadham, "Disruption is Here To Stay—Are You Prepared?", Celerity, Feb. 2017, 3 pages.

Laplante et al., "Solving Quality and Maintenance Problems with AI, Combining Machine Learning, Deep Learning, and Associative Memory Reasoning to Improve Operations", O'Reilly®, Apr. 2018, 35 pages.

Parris, "Minds + Machines: Meet A Digital Twin", GE Digital, YouTube, Nov. 18, 2016, 2 pages.

* cited by examiner

DIGITAL TWIN ARTICLE RECOMMENDATION CONSULTATION

BACKGROUND

The present invention relates generally to the field of computing, and more particularly to digital twin technology.

A digital twin is a digital representation of a physical asset, which may include various shapes and sizes. Similar to a human twin, the digital twin may be born at the same time as the physical asset with similar base features as the initial asset. It then grows over time to mimic the experiences of the physical asset. The digital twin, however, may live on the cloud and could become separated from the real-life asset.

SUMMARY

Embodiments of the present invention disclose a method, computer system, and a computer program product for consulting a technician on one or more appropriate articles based on a digital twin associated with a physical asset. Embodiments of the present invention may include assigning the technician to a job associated with the physical asset. The present invention may then include associating the digital twin with the physical asset. The present invention may also include matching one or more digital twin resources from a digital twin repository associated with the associated digital twin to the physical asset. The present invention may then include identifying a piece of relevant data from the matched one or more digital twin resources to the job associated with the physical asset. The present invention may further include identifying the one or more appropriate articles for the assigned technician to utilize to perform the job associated with the physical asset from the identified piece of relevant data.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method and program product for consulting a technician on one or more tools to perform an assignment on a physical asset by utilizing a digital twin associated with the physical asset. As such, embodiments of the present invention have the capacity to improve the technical field of digital twin technology, which integrates the technical fields of artificial intelligence (AI), Internet of Things (IoT) and data analytics, by utilizing a digital twin to identify one or more tools to perform an assigned job and consult a technician accordingly. More specifically, the digital twin consultation program may assign a job corresponding with a physical asset to a technician, and then the digital twin consultation program determines whether the physical asset has a digital twin. If no digital twin exists for the physical asset, then the digital twin consultation program ends. If, however, a digital twin exists, then the digital twin resources are matched with the physical asset in which relevant data associated with the assignment may be identified and extracted. The digital twin consultation program may then identify the appropriate equipment and tools (i.e., tools) for the technician to perform the assigned job.

As previously described, a digital twin is a digital representation of a physical asset, which may include various shapes and sizes. Similar to a human twin, the digital twin may be born at the same time as the physical asset with similar base features as the initial asset. It then grows over time to mimic the experiences of the physical asset. The digital twin, however, may live on the cloud and could become separated from the real-life asset.

When a technician has to perform maintenance or replace a part of the physical asset, the technician may utilize a specific set of tools to perform a job. Therefore, it may be advantageous to, among other things, allow the technician to lookup the parts to understand the tool requirements.

According to at least one embodiment, the digital twin program may utilize real time Internet of Things (IoT) sensor symptoms, along with contextual information from the Digital Twin, such as scheduled maintenance, warranty information, or recalled parts to alert technician of appropriate tools to properly to perform a job, while on site with the asset corresponding to the digital twin. Some equipment may utilize specialized tools that may invalidate the warranty, if work is performed by unauthorized tools (i.e., tools not previously authorized).

Figure 1:
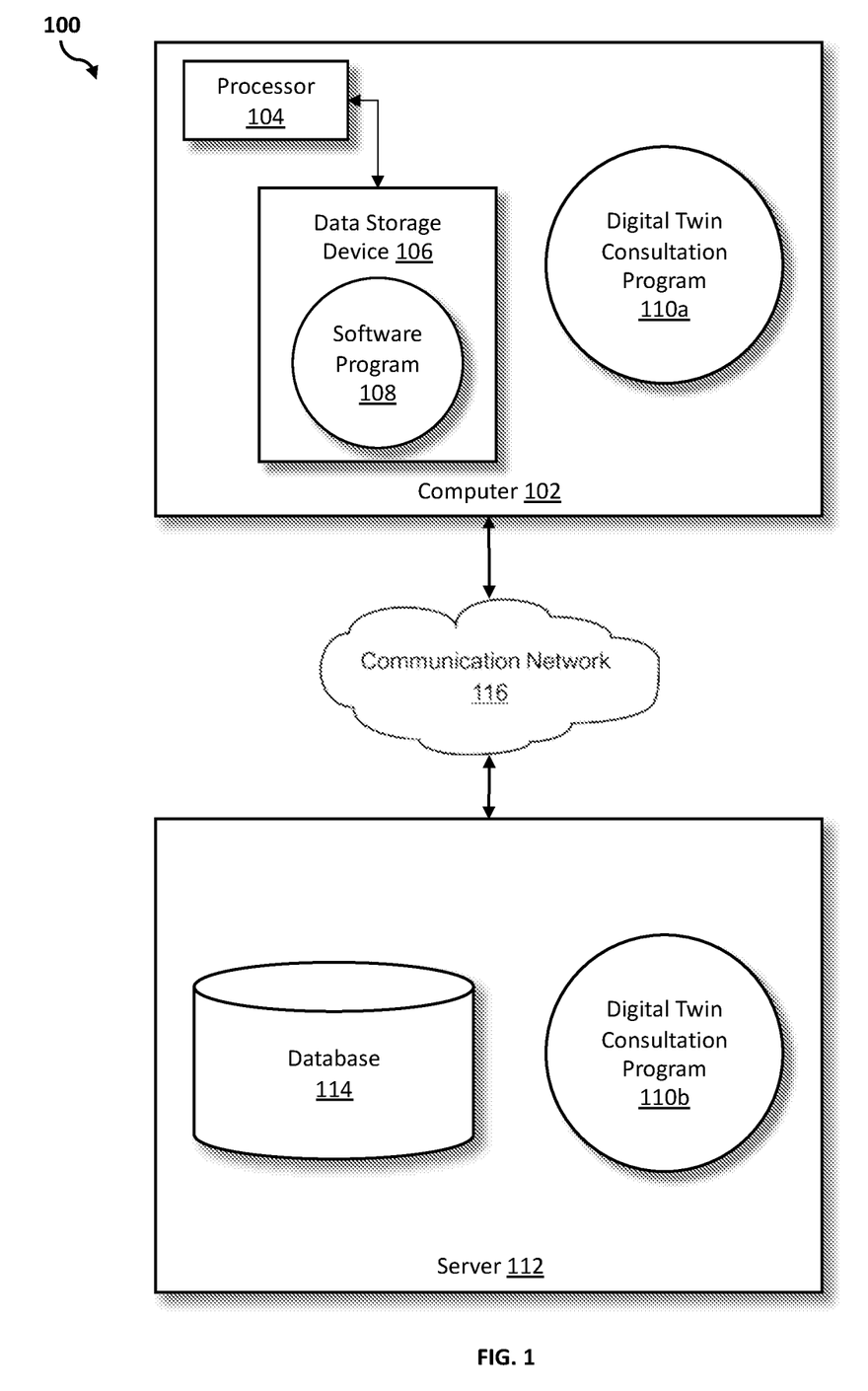
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a digital twin consultation program 110a. The networked computer environment 100 may also include a server 112 that is enabled to run a digital twin consultation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the digital twin consultation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the digital twin consultation program 110a, 110b (respectively) to determining the appropriate equipment, physical guides (i.e. paper owner or operating manuals), and tools (i.e., articles) for a technician to utilize to perform a job by utilizing a digital twin. The digital twin consultation method is explained in more detail below with respect to FIG. 2.

Figure 2:
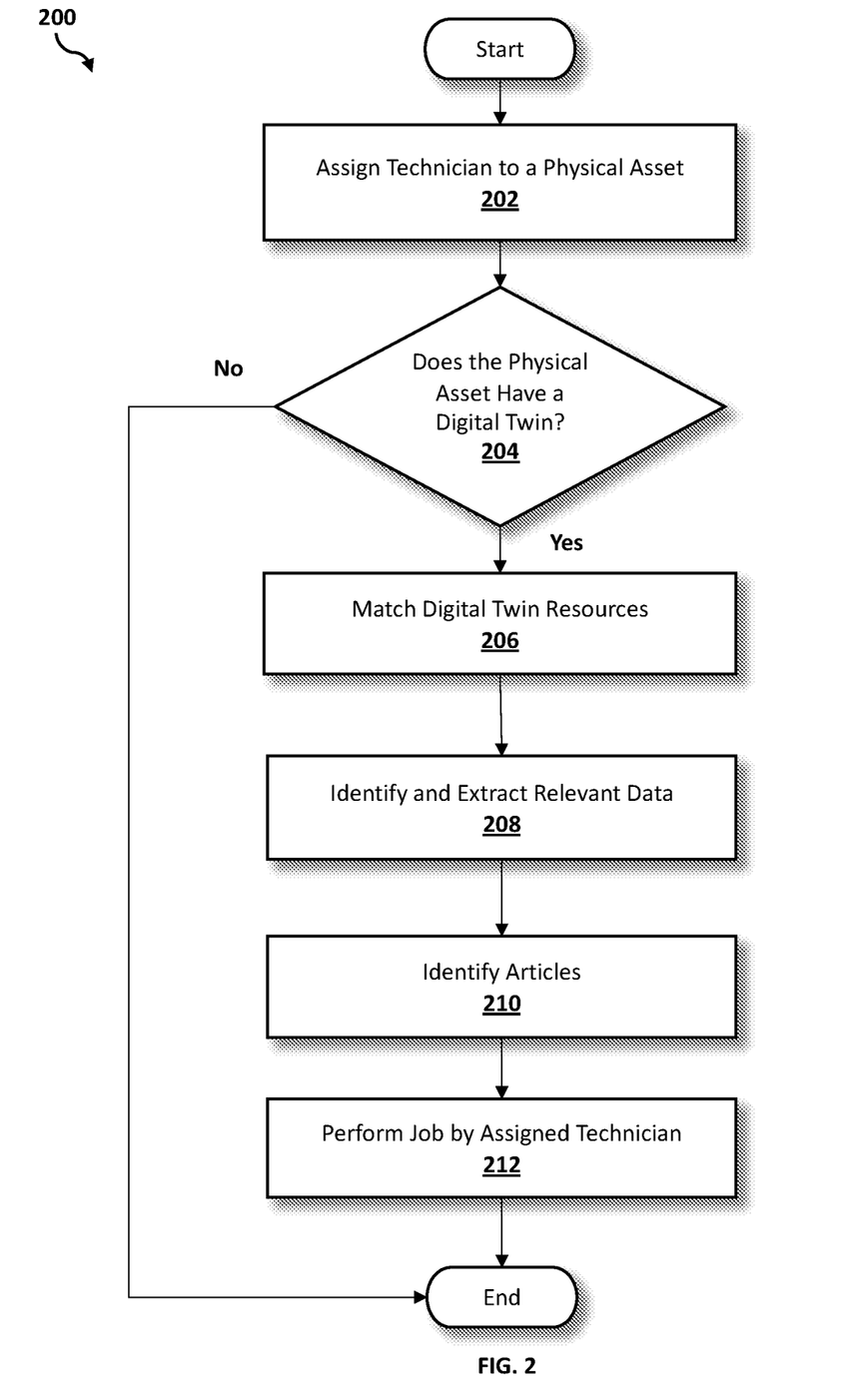
FIG. 2 is an operational flowchart illustrating a process for digital twin consulting according to at least one embodiment.

Referring now to FIG. 2, an operational flowchart illustrating the exemplary digital twin consultation process 200 used by the digital twin consultation program 110a, 110b according to at least one embodiment is depicted.

At 202, a technician is assigned to a physical asset. A technician (or field technician) may be assigned to a physical asset to perform a task or assignment. The digital twin consultation program 110a, 110b may first identify the physical asset.

In at least one embodiment, the technician may scan an identifier or tag on the physical asset by utilizing a scanning device (e.g., application associated with a mobile device, camera, scanning device). Each physical asset may be tagged or marked with an encryption key or a unique identifier that may be connected to a digital twin repository (e.g., database 114). The digital twin consultation program 110a, 110b may be associated with the digital twin repository, which includes a list or registry of physical assets with a digital twin. In one embodiment, the digital twin repository may include a digital agreement (i.e., an agreed-upon contract between the buyer of the physical asset and the manufacturer or seller of the physical asset), files associated with the digital agreement (e.g., user manuals, Bill of Material, warranty information, warranty claims, maintenance plans, maintenance history, part replacement/usage history, specifications, three-dimensional (3D) models/computer-aided design (CAD) drawings, fault codes, scheduled maintenance plans, operating manuals, usage (e.g., Internet of Things (IoT) sensor readings), operating history, owner, change of ownership), length of time for the digital twin to remain accessible, and the standard steps based on the files associated with the digital twin.

In at least one other embodiment, the technician may access a digital twin repository to select the physical asset. The technician may search the digital twin repository to select the physical asset. The technician may limit the options of physical assets available on the digital twin repository based on the preferences of the technician (i.e., technician preferences), which may include the type of physical asset (e.g., hardware, software, electrical devices), and specific model numbers or years associated with a physical asset (e.g., dishwasher Model X5B62 manufactured between the years 2010-2017).

In other embodiments, the technician may choose a work order with an enterprise asset management (EAM) tool (e.g., Maximo) to perform a specific task and/or assignment (e.g., recall, part replacements, routine maintenance) based on the technician preferences associated with the type of physical asset and specific model numbers or years associated with a physical asset.

In some embodiments, the technician may utilize image recognition tools with a camera to identified the physical asset. The camera may obtain one or more images of the physical asset, which may be transmitted, via the communication network 116, to one or more image recognition or image processing tools (e.g., convolutional neural networks (CNNs), pattern recognition). The image recognition or image processing tools may identify the objects shown in an image of the physical asset. In various image recognition and image processing tools, the image may be broken down in a number of tiles that is individually analyzed, or classified into objects or classes based on key features, to determine the identity of the objects presented in the image to identify the physical asset. The identified physical asset may then be transmitted, via the communication network 116, to the digital twin consultation program 110a, 110b. The digital twin consultation program 110a, 110b may then utilize the location of the technician and probable location of similar physical assets that match the identity provided by the image recognition and image processing tools to identify the specific physical asset selected by the technician. For example, the opening of the camera on a computing device, a mobile device will determine the type of physical asset and match the location of the available physical assets for the technician to determine the likely physical asset the technician is in close proximity to.

In at least one embodiment, once the identity of the physical asset is determined, the digital twin consultation program 110a, 110b may prompt the technician (e.g., via dialog box) to confirm the identity of the physical asset. For example, in a dialog box, the digital twin consultation program 110a, 110b will indicate the identity of the physical asset, with affirmative and negative buttons (e.g., "Yes" and "No" buttons, green or red buttons, checkmark and "X" buttons), located at the bottom of the dialog box. If the technician clicks the affirmative button, then the digital twin consultation program 110a, 110b will proceed to assignment of the physical asset to the technician. If, however, the technician clicks the negative button, then the digital twin consultation program 110a, 110b may proceed to re-analyze the physical asset (e.g., attempt to utilize one or more image recognition and image processing tools to identify the physical asset), or may provide the technician with the option of manually inputting, into the digital twin consultation program 110a, 110b, the identity of the physical asset.

Then, after the physical asset is identified and the identity of the physical asset is transmitted to the digital twin consultation program 110a, 110b, then the digital twin consultation program 110a, 110b may automatically assign the identified physical asset, selected by the technician, to the technician. In at least one embodiment, the technician may manually request to be assigned to the identified physical asset, which may then be transmitted to the digital twin consultation program 110a, 110b.

In some embodiments, the digital twin consultation program 110a, 110b may automatically assign the physical asset, even if not selected by the technician, when the physical asset matches the technician preferences, the technician is located in close proximity to the physical asset, and other factors that may increase the likelihood that the technician may agree with the assignment (e.g., technician previously received positive reviews from the manufacturer or customer at that location, technician previously repaired or fixed the physical asset or other similar physical assets based on brand and model numbers and/or location). The digital twin consultation program 110a, 110b may, in at least one embodiment, prompt (e.g., via dialog box) to the technician to confirm whether the technician agrees to be assigned to the physical asset in which the technician may respond affirmatively or negatively. If the technician responds affirmatively (e.g., clicks "Yes" button, "Proceed" button, green button, checkmark button), then the digital twin consultation program 110a, 110b may proceed with the assigning the physical asset to the technician. If, however, the technician responds negatively (e.g., clicks "No" button, "Stop" button, "Cancel" button, red button, "X" button), then the digital twin consultation program 110a, 110b may cease with assigning the physical asset to the technician.

For example, Technician B is responsible for repairing and maintaining underground mining trucks manufactured by Company SK. The technician receives Work Order B from an EAM tool, which indicates that a recall should be performed on Underground Mining Truck B, specifically recall Part B should be replaced with Part C. Work Order B is then transmitted to the digital twin consultation program 110a, 110b, and, since Technician B is located in close proximity to Underground Mining Truck B, the digital twin consultation program 110a, 110b prompts Technician B to confirm whether Technician B agrees to be assigned to the Underground Mining Truck B. Technician B responds affirmative, and then the digital twin consultation program 110a, 110b assigns Underground Mining Truck B to Technician B.

Next, at 204, the digital twin consultation program 110a, 110b determines whether the physical asset has a digital twin. When the physical asset is identified and assigned to the technician, the digital twin consultation program 110a, 110b may search (or lookup) the digital twin repository to determine whether a digital twin exists for the identified physical asset. Once the digital twin consultation program 110a, 110b is determined that a digital twin exists for the physical asset, the digital twin repository may return the digital twin associated with the physical asset. The digital twin for the physical asset may include digital twin resources that may be utilized by the technician to perform a task and/or an assignment associated with the physical asset.

In at least one embodiment, the digital twin consultation program 110a, 110b may retrieve the encryption key and/or unique identifier for the physical asset, and may utilize the encryption key and/or unique identifier to search the digital twin repository for a digital twin that matches the physical asset. In some embodiments, the technician may utilize a scanning device to retrieve the encryption key and/or unique identifier for each physical asset to match that encryption key and/or unique identifier to a corresponding digital twin in the digital twin repository. For example, Technician Z works at an engineering company that just purchased Truck Z from Manufacturer Z. Technician Z scans the tags on the Truck Z, and the digital twin consultation program 110a, 110b searches the digital twin repository, which included hundreds of thousands of digital twins. Using the unique identifier from Truck Z, the digital twin consultation program 110a, 110b determines that the location of the digital twin (Digital Twin Z) specific to Truck Z for Technician Z.

Continuing the previous example, the digital twin consultation program 110a, 110b performs a lookup on the digital twin repository to determine whether a digital twin exists for the Underground Mining Truck B.

If the digital twin consultation program 110a, 110b determines that a digital twin fails to exist for the physical asset at 204, then the digital twin consultation program 110a, 110b is concluded. In the absence of a digital twin for the physical asset, there may be no digital twin resources for the digital twin consultation program 110a, 110b to access to assist the technician to perform the task and/or assignment associated with the physical asset. Therefore, the digital twin consultation program 110a, 110b may end (or conclude) in the absence of such digital twin with the physical asset.

In at least one embodiment, when the digital twin consultation program 110a, 110b determines that digital twin fails to exist for the physical asset, the digital twin consultation program 110a, 110b may prompt (e.g., via dialog box) the technician that no digital twin exists for the physical asset, and therefore, the digital twin consultation program 110a, 110b will conclude. For example, the digital twin consultation program 110a, 110b determines that Physical Asset A does not have a digital twin in the digital twin repository. Therefore, the digital twin consultation program 110a, 110b prompts Technician A, via dialog box, that indicates "No digital twin exists for Physical Asset A."

In the present embodiment, if the technician determines that the digital twin consultation program 110a, 110b may be erroneous and that there should be a digital twin on the digital twin repository, then the technician may click the "Digital Twin Repository" button located on the bottom of the dialog box that indicated that there exists no digital twin. The technician may search the digital twin repository by keywords, date the physical asset was manufactured (i.e., physical asset manufacturing date), or other search terms to find the digital twin associated with the physical asset.

Continuing the previous example, if the digital twin consultation program 110a, 110b determines that there is no digital twin for Underground Mining Truck B, then Technician B would be prompted that there exists no digital twin for Underground Mining Truck B, and therefore, the digital twin consultation program 110a, 110b will end.

If, however, the digital twin consultation program 110a, 110b determines that the digital twin exists for the physical asset at 204, then the digital twin resources are matched at 206. Once the digital twin consultation program 110a, 110b identifies that a digital twin exists for the physical asset, the digital twin consultation program 110a, 110b may retrieve and match the digital twin resources associated with the digital twin corresponding with the physical asset in the digital twin repository (e.g., a part recall, information about the part to be removed and/or replaced and any specific instructions). The digital twin resources may include user/operating manuals, bill of material, warranty, maintenance plans/procedures, specifications, 3D model/CAD drawings, fault codes, scheduled maintenance plans, usage (e.g., IoT sensor readings), artificial intelligence (AI)/prediction, history, owner, change in ownership, safety notifications/alerts, repair procedures, and troubleshooting tips.

Continuing the previous example, the digital twin consultation program 110a, 110b searches the digital twin repository and finds that a digital twin (Digital Twin B) exists for Underground Mining Truck B. The digital twin consultation program 110a, 110b then matches the digital twin resources associated with Digital Twin B, which includes a maintenance procedures document (X), a repair procedures document (Z) and an operating manual (Y) associated with Digital Twin B and Underground Mining Truck B.

Then, at 208, the relevant data is identified and extracted. A parsing engine may be utilized by the digital twin consultation program 110a, 110b to search through the work order or document associated with the type of task and/or assignment to be performed by the technician. The parsing engine may also search (i.e., simultaneously or consecutively while searching the work order or associated document) through the digital twin resources to identify relevant data based on key words (e.g., type of the task and/or assignment) to identify features (e.g., relevant data) associated with the physical asset by comparing the work order and/or document associated with the task and/or assignment to be performed by the technician with the files within the digital twin resources. Relevant data may include any files, information or data associated with the task and/or assignment of the physical asset (e.g., reason for the technician to visit or perform the task and/or assignment on the physical asset) in which the parsing engine utilized by the digital twin consultation program 110a, 110b.

Once relevant data associated with the physical asset is identified, the parsing engine may use a machine learning (ML) model to extract the context and information collected from the relevant data by utilizing natural language processing (NLP) techniques for textual data and visual recognition techniques for image data. More specifically, for NLP, an external engine may utilize an NLP technique (e.g., structure extraction, language identification, tokenization, decompounding, lemmatization/stemming, acronym normalization and tagging, entity extraction, phrase extraction) to process the collected textual data. Then, individual words, phrases, and/or sentences, as well as the relationships between the individual words, phrases and/or sentences, may be extracted from the processed textual data by utilizing various extraction approaches (e.g., top down, bottoms up, statistical). As a result, the crawl component may interpret the context and meaning for the words, phrases and/or sentences collected by the textual data.

With image data, the parsing engine may utilize one or more image recognition and processing tools (e.g., convolutional neural networks (CNNs), pattern recognition) to identify objects shown in an image (e.g., diagram). In various image recognition and processing tools, an image may be broken down in a number of tiles that is individually analyzed, or classified into objects or classes based on key features, to determine the identity of the objects presented in the image.

The digital twin consultation program 110a, 110b may analyze the identified and extracted relevant data to determine the appropriate tools and equipment (i.e., articles) to perform the task and/or assignment of the physical asset. For example, a safety recall will indicate the replacement parts and tools appropriate to perform a specific task and/or assignment, such as a specific size wrench.

In at least one embodiment, the identified and extracted relevant data from the digital twin resources may include appropriate steps and/or procedures to perform the task and/or assignment associated with the physical asset, which is connected to the reason for the visit of the technician.

Continuing the previous example, the digital twin consultation program 110a, 110b compares with Work Order B with the content and information included in the maintenance procedures document (X), the repair procedures document (Z) and the operating manual (Y) to determine which files include relevant data associated with the job. The digital twin consultation program 110a, 110b uses semantic analytics to scan X, Y and Z, and pull out relevant data to the replacement of Part B with Part C.

Then, at 210, the appropriate articles are identified. The digital twin consultation program 110a, 110b may then present the appropriate articles (i.e., equipment and tools) for performing the task and/or assignment for the physical asset. In at least one embodiment, the digital twin consultation program 110a, 110b may present, to the technician, the appropriate equipment and tools within the calendaring tool for the upcoming job. In at least one other embodiment, the digital twin consultation program 110a, 110b may add the appropriate equipment and tools to a to-do (or task) list or reminder for the technician, when the technician is preparing for an upcoming job. In one other embodiment, the digital twin consultation program 110a, 110b may save the appropriate equipment and tools within the work order (e.g., EAM work order, Maximo work order). In some embodiments, the digital twin consultation program 110a, 110b may show the appropriate equipment and tools, when there is an indication that the technician is commuting to job site (e.g., when the technician enters a car, or the global positioning system (GPS) shows that the technician is in a state of motion, direction of travel, and historical travel information towards the job site).

In at least one embodiment, the digital twin consultation program 110a, 110b may prompt (e.g., via dialog box) the technician to indicate whether the technician has the identified appropriate equipment and tools. If the technician responds affirmatively (e.g., clicks "Yes" button, green button, checkmark button), then the digital twin consultation program 110a, 110b may close the dialog box. If, however, the technician responds negatively (e.g., clicks "No" button, red button, "X" button), then the digital twin consultation program 110a, 110b may utilize an application associated with the mobile device, or vehicle, to identify stores or retail locations in which the technician may purchase the identified equipment and tools in close proximity while commuting to the physical asset.

In some embodiments, the digital twin consultation program 110a, 110b may prompt (e.g., via dialog box) the technician to identify which of the appropriate equipment and tools that the technician is missing or does not have in the technician's possession. The digital twin consultation program 110a, 110b request to identify the missing equipment and tools may be triggered when the technician determines that the appropriate equipment and tools, including specialty equipment and tools, that may not be purchased at one type of store or location. For example, if the appropriate equipment and tools include a hammer that may be purchased at a hardware store, and a specialty electrical fuse for an older model that may be purchased at specific niche hardware stores.

In one embodiment, since the Technician B may be driving, while prompted to indicate whether the technician has the identified appropriate equipment and tools, the technician may utilize a virtual assistant device to orally or verbally communicate responses to the digital twin consultation program 110a, 110b.

Continuing the previous example, to replace recall Part B with Part C, the digital twin consultation program 110a, 110b identifies three different sizes socked wrenches to perform the job: a 2", 3" and/or 5" wrench. As such, when Technician B starts the vehicle associated with Technician B, Technician B receives an alert on Technician B's smart phone notifying Technician B of the identified wrenches and reminds Technician B to bring one or more of the identified wrenches to the job. After receiving the alert, Technician B realizes that Technician B misplaced the 3" wrench. As such, Technician B indicates to the digital twin consultation program 110a, 110b that Technician B does not have the three types of wrenches. The digital twin consultation program 110a, 110b then utilizes a mobile application to direct Technician B to various stores in which Technician B can purchase one or more of the wrenches while commuting to the job site.

Then, at 212, the job is performed by the assigned technician. When the technician arrives at the job site to perform the task and/or assignment on the physical asset, the appropriate equipment and tools may be associated with the task and/or assignment based on the extracted relevant data from the digital twin resources. Upon arriving at the job site, the technician may retrieve the extracted relevant data from the digital twin resources by, in at least one embodiment, utilizing a scanning device to scan the tag, encryption key or a unique identifier associated with the physical asset. In some embodiments, the technician may utilize an image recognition tool to retrieve (or pull up) the extracted relevant data from the digital twin resources based on the image of the physical asset.

In another embodiment, the technician may perform a reverse lookup in which the technician may scan a specific equipment or tool from the appropriate equipment and tools to determine the instructions or steps to which that specific equipment or tools within the task and/or assignment for the physical asset. For example, when the technician scans the wrench, the technician is presented with the recall instructions where the wrench is used.

Continuing the previous example, Technician B arrives at the job site and Technician B is able to start to replace recall Part B with Part C. However, Technician B is uncertain why a 3" wrench was included as an appropriate equipment and tools. As such, Technician B scans the unique identifier on the 3" wrench and the digital twin consultation program 110a, 110b looks up on the digital twin resources the contextually relevant data on the 3" wrench. The digital twin consultation program 110a, 110b retrieves the repair procedures document Z and displays, on a mobile device associated with Technician B, Step 22 where the instructions call for a 3" wrench to loosen the bolts next to recall Part B.

In the present embodiment, the digital twin consultation program 110a, 110b may present different equipment and tools that may be utilized, which were not a part of the original recommendation of the digital twin consultation program 110a, 110b. Additionally, the digital twin consultation program 110a, 110b may present the location (e.g., store) in close proximity to the physical asset, or in route to the physical asset, in which the technician may retrieve the different equipment and tools (i.e., alternate equipment and tools). In at least one embodiment, the digital twin consultation program 110a, 110b may update the digital twin resources to associated the job reason with including the alternate equipment and tools to assist future technicians. In some embodiments, the digital twin consultation program 110a, 110b may retrieve feedback from the technician, and may share retrieved feedback with the manufacturer. For example, Technician A noticed that a 5" socket wrench is better than a 4" socket wrench to repair the recall issues associated with 234A5 and sending feedback to the digital twin consultation program 110a, 110b. The digital twin consultation program 110a, 110b shares the feedback to the manufacturer by utilizing a previously compiled list of contact information associated with various manufacturers.

In the present embodiment, a previously compiled list of contact information for the manufacturers may be included in the digital twin repository. The previously compiled list of contact information for the manufacturers may include contact information for the appropriate manufacturers (e.g., email address, name of contact representative for each manufacturers, telephone number, mailing address, preferred method of contact, historical data associated with past feedback to such manufacturers (i.e., feedback history)) that may be stored in the digital twin repository.

The digital twin consultation program 110a, 110b may improve the functionality of the computer, the technology and/or the field of technology by utilizing a digital twin associated with a physical asset to consult the scheduled technician and to identify the appropriate equipment and tools to perform the task and/or assignment (i.e., job) on the physical asset. Additionally, the digital twin consultation program 110a, 110b may increase the reliability of equipment and production lines, improve overall equipment effectiveness (OEE) through reduced downtime and improved performance and productivity.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
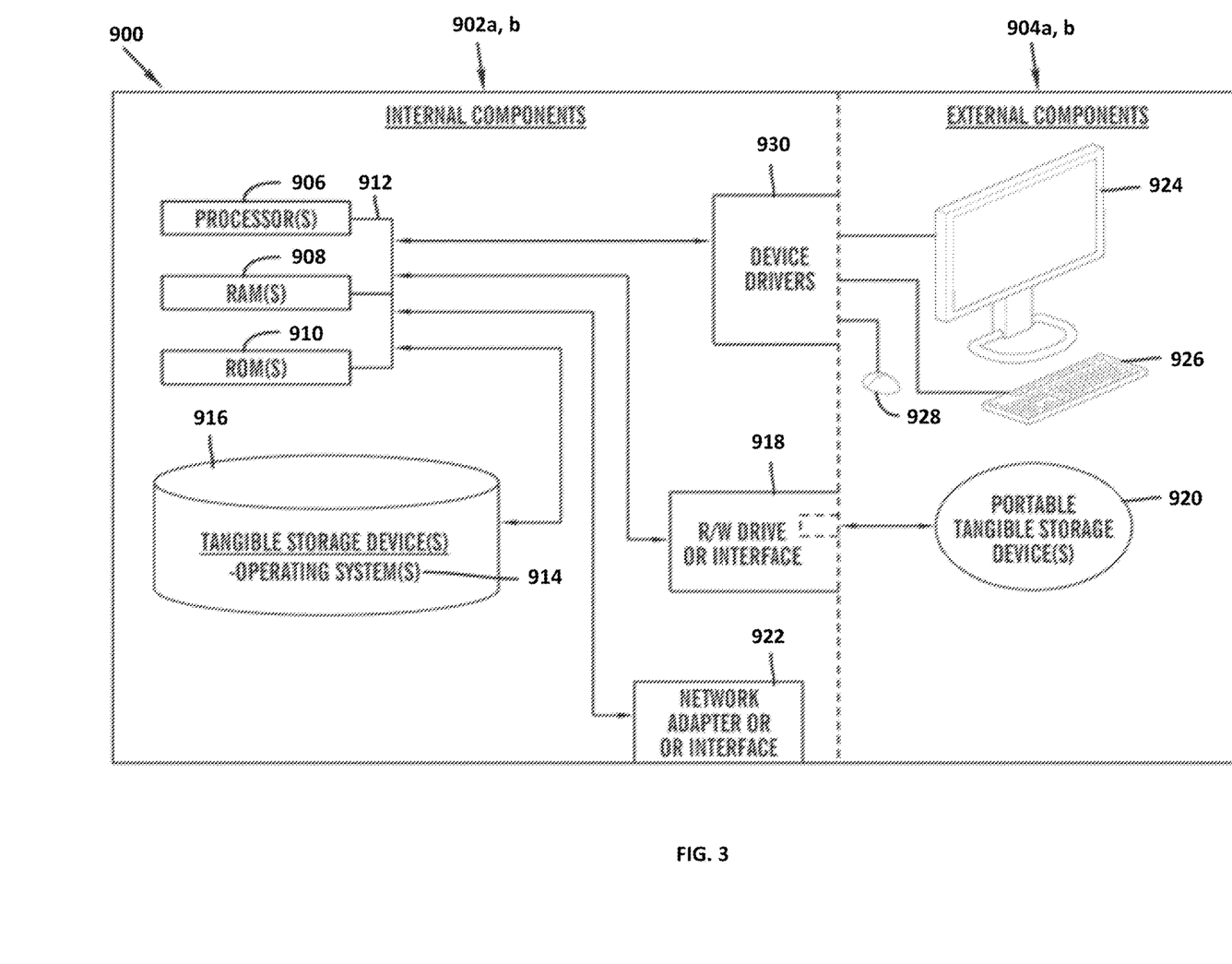
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a,b and external components 904a,b illustrated in FIG. 3. Each of the sets of internal components 902a,b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the digital twin consultation program 110a in client computer 102, and the digital twin consultation program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a,b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the digital twin consultation program 110a, 110b can be stored on one or more of the respective portable computer-readable tangible storage devices 920, read via the respective R/W drive or interface 918 and loaded into the respective hard drive 916.

Each set of internal components 902a,b may also include network adapters (or switch port cards) or interfaces 922 such as a TCP/IP adapter cards, wireless wi-fi interface cards, or 3G or 4G wireless interface cards or other wired or wireless communication links. The software program 108 and the digital twin consultation program 110a in client computer 102 and the digital twin consultation program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the digital twin consultation program 110a in client computer 102 and the digital twin consultation program 110b in network server computer 112 are loaded into the respective hard drive 916. The network may comprise copper wires, optical fibers, wireless transmission, routers, firewalls, switches, gateway computers and/or edge servers.

Each of the sets of external components 904a,b can include a computer display monitor 924, a keyboard 926, and a computer mouse 928. External components 904a,b can also include touch screens, virtual keyboards, touch pads, pointing devices, and other human interface devices. Each of the sets of internal components 902a,b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
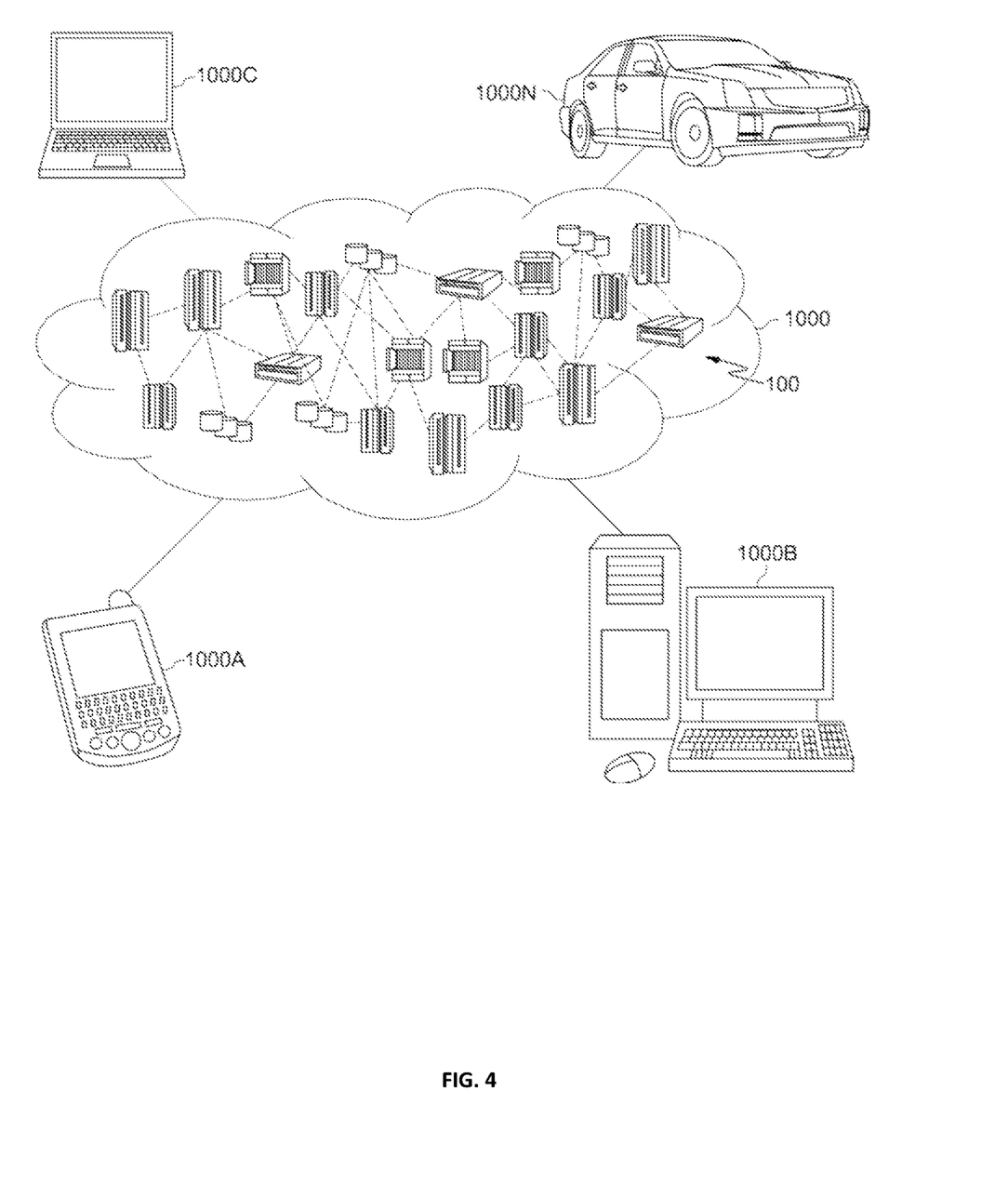
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
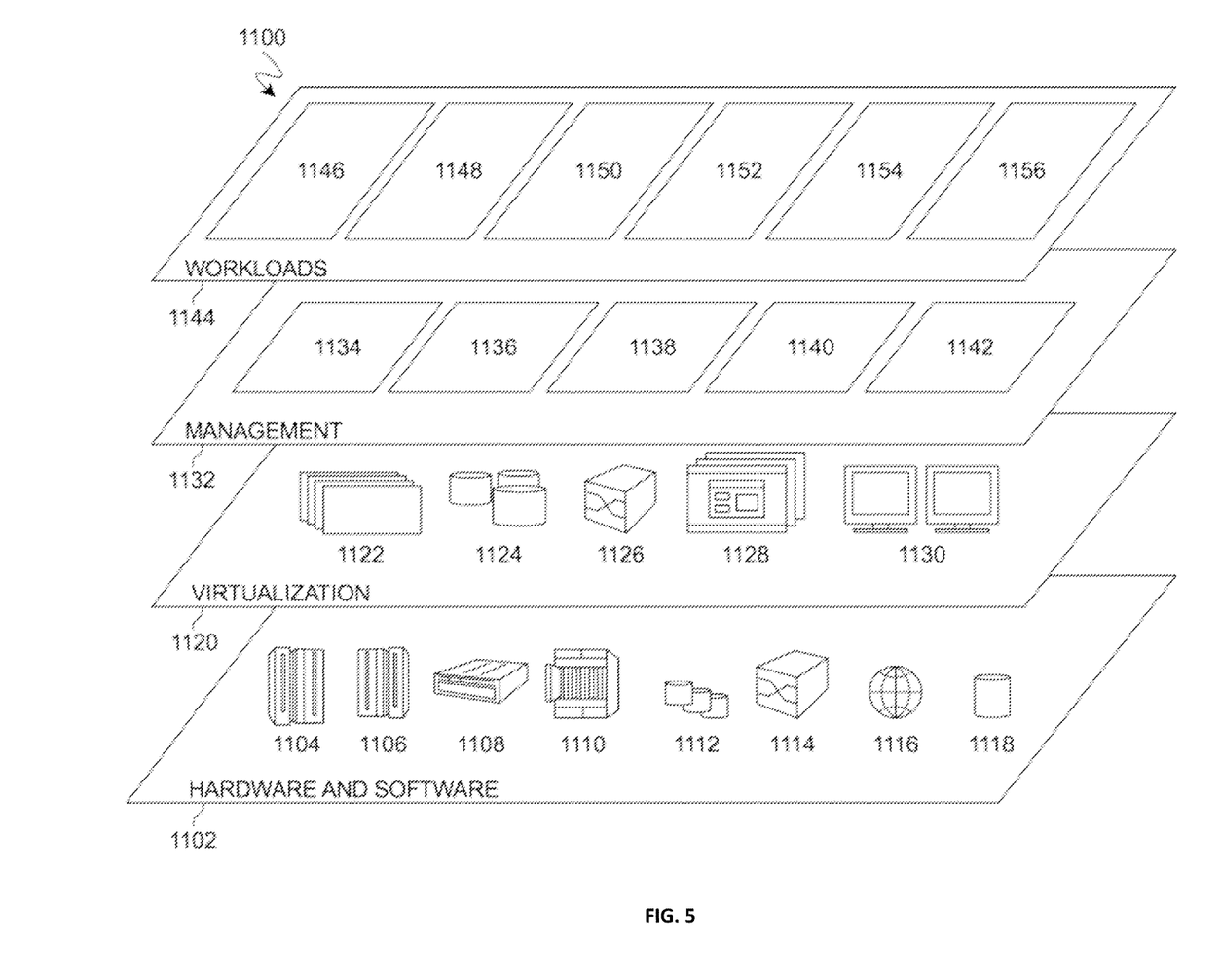
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and digital twin consultation 1156. A digital twin consultation program 110a, 110b provides a way to consulting a technician on appropriate articles based on a digital twin associated with a physical asset.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   recording one or more real-time internet of things (IoT) sensor readings associated with a physical asset;
   identifying, based on the one or more real-time IoT sensor readings, one or more real-time IoT sensor symptoms associated with the physical asset;
   assigning, based on the real-time Internet of Things sensor symptoms associated with the physical asset, a technician to a job associated with the physical asset;
   capturing one or more digital images of a physical object with a camera-equipped mobile device;

identifying the physical object using a convolutional neural network to break down the one or more digital images into one or more tiles that are individually classified into objects or classes based on one or more key features;

identifying the physical object as the physical asset based on matching a location of the mobile device against locations of one or more physical assets, and comparing, using the convolutional neural network, the one or more digital images against existing images of the one or more physical assets;

associating a digital twin with the physical asset;

matching one or more digital twin resources from a digital twin repository associated with the associated digital twin to the physical asset;

identifying a piece of relevant data from the matched one or more digital twin resources to the job associated with the physical asset; and identifying one or more appropriate articles for the assigned technician to utilize to perform the job associated with the physical asset from the identified piece of relevant data;

responsive to determining that the technician is commuting to a job site based on GPS location data of the technician recorded by the mobile device, displaying the appropriate equipment to the technician; and prompting, via a dialogue box, the technician to identify whether the technician possesses the identified one or more articles.

2. The method of claim 1, wherein identifying the physical asset associated with the job further comprises:
confirming, by the technician, an identity associated with the identified physical asset.

3. The method of claim 2, further comprising:
selecting, by the technician, a work order with an enterprise asset management tool to perform the job associated with the physical asset, wherein the technician is provided access to the work order based on the one or more technician preferences.

4. The method of claim 2, further comprising:
automatically assigning the technician to the job associated with the physical asset based one or more technician preferences, and a location associated with the technician.

5. The method of claim 1, wherein associating the digital twin with the physical asset, further comprises:
retrieving an identifier associated with the physical asset;
searching the digital twin repository for the retrieved identifier associated with the physical asset; and
matching the retrieved identifier associated with the physical asset to the corresponding digital twin in the digital twin repository.

6. The method of claim 1, further comprising:
searching the one or more digital twin resources for a plurality of information associated with the job to identify the piece of relevant data based on one or more keywords, wherein the plurality of information associated with the job are compared to the one or more digital twin resources;
extracting the piece of relevant data from the identified piece of relevant data associated with the matched one or more digital twin resources by utilizing a machine learning model;
transmitting, to the assigned technician, the extracted piece of relevant data, wherein the extracted piece of relevant data includes the one or more appropriate articles for the assigned technician to perform the job associated with the physical asset.

7. The method of claim 1, further comprising:
in response to determining the assigned technician is traveling to a location associated with the physical asset, determining the identified one or more appropriate articles for the assigned technician is absent from the assigned technician; and
transmitting an alert signal to the assigned technician, wherein the transmitted alert signal includes a reminder associated with the identified one or more appropriate articles.

8. A computer system for consulting a technician on one or more appropriate articles based on a digital twin associated with a physical asset, comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
recording one or more real-time internet of things (IoT) sensor readings associated with a physical asset;
identifying, based on the one or more real-time IoT sensor readings, one or more real-time IoT sensor symptoms associated with the physical asset;
assigning, based on the real-time Internet of Things sensor symptoms associated with the physical asset, a technician to a job associated with the physical asset;
capturing one or more digital images of a physical object with a camera-equipped mobile device;
identifying the physical object using a convolutional neural network to break down the one or more digital images into one or more tiles that are individually classified into objects or classes based on one or more key features;
identifying the physical object as the physical asset based on matching a location of the mobile device against locations of one or more physical assets, and comparing, using the convolutional neural network, the one or more digital images against existing images of the one or more physical assets;
associating a digital twin with the physical asset;
matching one or more digital twin resources from a digital twin repository associated with the associated digital twin to the physical asset;
identifying a piece of relevant data from the matched one or more digital twin resources to the job associated with the physical asset; and
identifying one or more appropriate articles for the assigned technician to utilize to perform the job associated with the physical asset from the identified piece of relevant data;
responsive to determining that the technician is commuting to a job site based on GPS location data of the technician recorded by the mobile device, displaying the appropriate equipment to the technician; and
prompting, via a dialogue box, the technician to identify whether the technician possesses the identified one or more articles.

9. The computer system of claim 8, wherein identifying the physical asset associated with the job further comprises:
confirming, by the technician, an identity associated with the identified physical asset.

10. The computer system of claim 9, further comprising:
selecting, by the technician, a work order with an enterprise asset management tool to perform the job associated with the physical asset, wherein the technician is provided access to the work order based on the one or more technician preferences.

11. The computer system of claim 9, further comprising:
automatically assigning the technician to the job associated with the physical asset based one or more technician preferences, and a location associated with the technician.

12. The computer system of claim 8, wherein associating the digital twin with the physical asset, further comprises:
retrieving an identifier associated with the physical asset;
searching the digital twin repository for the retrieved identifier associated with the physical asset; and
matching the retrieved identifier associated with the physical asset to the corresponding digital twin in the digital twin repository.

13. The computer system of claim 8, further comprising:
searching the one or more digital twin resources for a plurality of information associated with the job to identify the piece of relevant data based on one or more keywords, wherein the plurality of information associated with the job are compared to the one or more digital twin resources;
extracting the piece of relevant data from the identified piece of relevant data associated with the matched one or more digital twin resources by utilizing a machine learning model;
transmitting, to the assigned technician, the extracted piece of relevant data, wherein the extracted piece of relevant data includes the one or more appropriate articles for the assigned technician to perform the job associated with the physical asset.

14. The computer system of claim 8, further comprising:
in response to determining the assigned technician is traveling to a location associated with the physical asset, determining the identified one or more appropriate articles for the assigned technician is absent from the assigned technician; and
transmitting an alert signal to the assigned technician, wherein the transmitted alert signal includes a reminder associated with the identified one or more appropriate articles.

15. A computer program product for consulting a technician on one or more appropriate articles based on a digital twin associated with a physical asset, comprising:
one or more computer-readable tangible storage media and program instructions stored on at least one of the one or more computer-readable tangible storage media, the program instructions executable by a processor to cause the processor to perform a method comprising:
recording one or more real-time internet of things (IoT) sensor readings associated with a physical asset;
identifying, based on the one or more real-time IoT sensor readings, one or more real-time IoT sensor symptoms associated with the physical asset;
assigning, based on the real-time Internet of Things sensor symptoms associated with the physical asset, a technician to a job associated with the physical asset;
capturing one or more digital images of a physical object with a camera-equipped mobile device;
identifying the physical object using a convolutional neural network to break down the one or more digital images into one or more tiles that are individually classified into objects or classes based on one or more key features;
identifying the physical object as the physical asset based on matching a location of the mobile device against locations of one or more physical assets, and comparing, using the convolutional neural network, the one or more digital images against existing images of the one or more physical assets;
associating a digital twin with the physical asset;
matching one or more digital twin resources from a digital twin repository associated with the associated digital twin to the physical asset;
identifying a piece of relevant data from the matched one or more digital twin resources to the job associated with the physical asset; and
identifying one or more appropriate articles for the assigned technician to utilize to perform the job associated with the physical asset from the identified piece of relevant data;
responsive to determining that the technician is commuting to a job site based on GPS location data of the technician recorded by the mobile device, displaying the appropriate equipment to the technician; and
prompting, via a dialogue box, the technician to identify whether the technician possesses the identified one or more articles.

16. The computer program product of claim 15, wherein identifying the physical asset associated with the job further comprises:
confirming, by the technician, an identity associated with the identified physical asset.

17. The computer program product of claim 16, further comprising:
selecting, by the technician, a work order with an enterprise asset management tool to perform the job associated with the physical asset, wherein the technician is provided access to the work order based on the one or more technician preferences.

18. The computer program product of claim 16, further comprising:
automatically assigning the technician to the job associated with the physical asset based one or more technician preferences, and a location associated with the technician.

19. The computer program product of claim 15, wherein associating the digital twin with the physical asset, further comprises:
retrieving an identifier associated with the physical asset;
searching the digital twin repository for the retrieved identifier associated with the physical asset; and
matching the retrieved identifier associated with the physical asset to the corresponding digital twin in the digital twin repository.

20. The computer program product of claim 15, further comprising:
searching the one or more digital twin resources for a plurality of information associated with the job to identify the piece of relevant data based on one or more keywords, wherein the plurality of information associated with the job are compared to the one or more digital twin resources;
extracting the piece of relevant data from the identified piece of relevant data associated with the matched one or more digital twin resources by utilizing a machine learning model;

transmitting, to the assigned technician, the extracted piece of relevant data, wherein the extracted piece of relevant data includes the one or more appropriate articles for the assigned technician to perform the job associated with the physical asset.

* * * * *